(No Model.)
F. L. WOLFE.
PRESSURE RECORDER.
No. 603,391. Patented May 3, 1898.
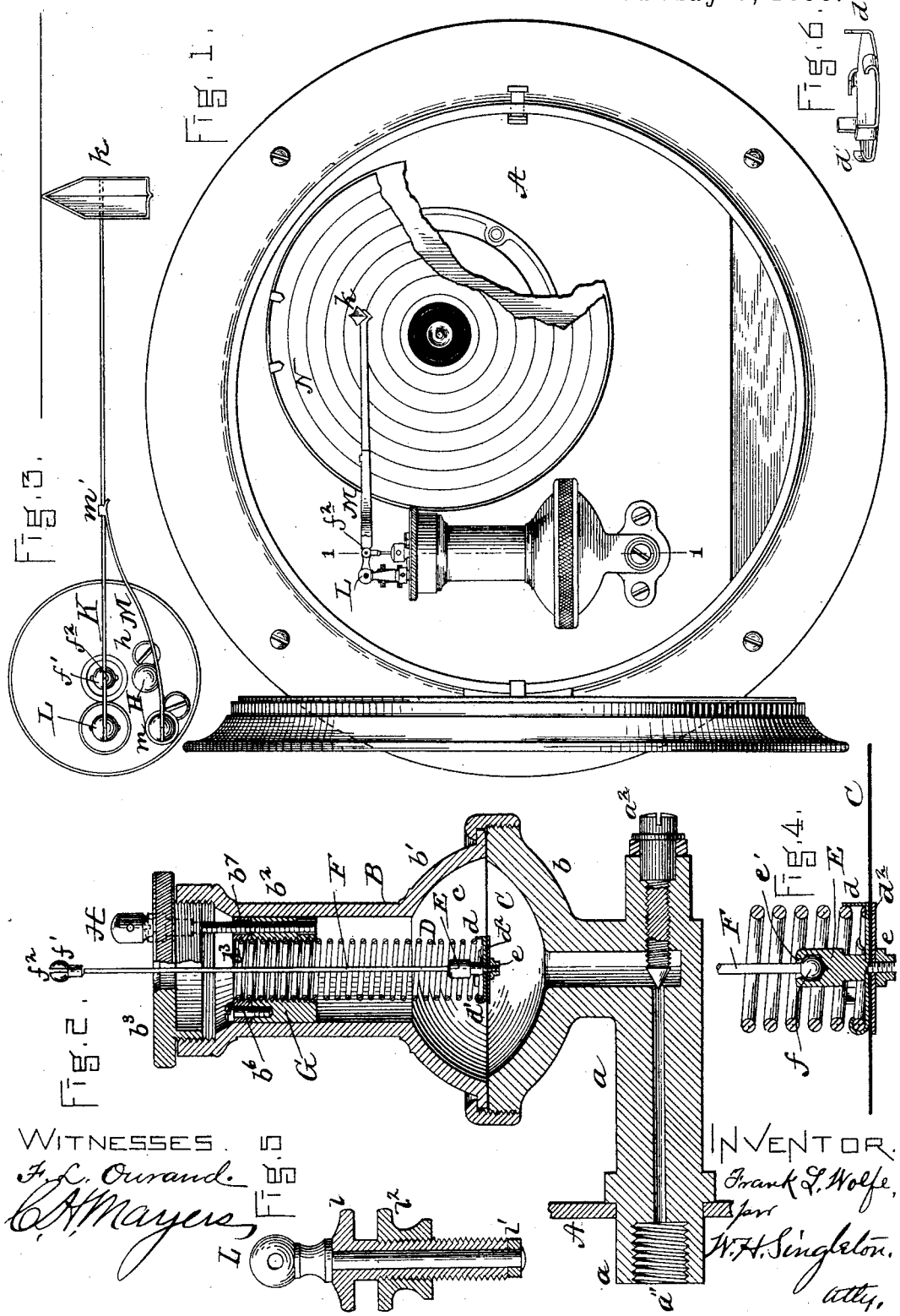

United States Patent Office.

FRANK LESLIE WOLFE, OF MEDFORD, MASSACHUSETTS, ASSIGNOR TO THE CROSBY STEAM GAGE AND VALVE COMPANY, OF BOSTON, MASSACHUSETTS.

PRESSURE-RECORDER.

SPECIFICATION forming part of Letters Patent No. 603,391, dated May 3, 1898.

Application filed November 21, 1896. Serial No. 612,923. (No model.)

*To all whom it may concern:*

Be it known that I, FRANK LESLIE WOLFE, a citizen of the United States, residing at Medford, in the county of Middlesex and State of Massachusetts, have invented certain new and useful Improvements in Pressure-Recorders; and I do hereby declare the following to be a full, clear, and exact description of the invention, such as will enable others skilled in the art to which it appertains to make and use the same.

This invention relates to improvements in pressure-recorders; and it consists of a pressure-recorder of a delicate character used where the pressure is very light, of only a few inches of water, and to be used in determining or recording the condition of such pressure as may be formed by force-drafts in mines, gas-pressure in street-mains, and may also be used for determining continuously the vacuum of chimney-drafts.

In the annexed drawings, Figure 1 represents a face view of a case to which the invention is applied, the cover of the case being open. Fig. 2 represents a transverse vertical section taken on the line 1 1, Fig. 1, looking from the left. Fig. 3 represents a top or plan view looking down upon the pencil-lever and the head of the chamber to which the pencil-lever is attached. Fig. 4 represents an enlarged sectional view of a portion of the apparatus contained within the chamber. Fig. 5 represents a sectional view of a detail for the vertical adjustment of the pencil-lever. Fig. 6 is a detail.

In the drawings, the letter A represents a case to which the apparatus is attached, an extension $a$ of the apparatus passing through the case and having the screw-threads $a'$ for attachment to a pipe leading to the device the pressure within which is to be recorded. Rising from this extension $a$ is the case B. The passage from the case and through the extension $a$ may be regulated by the valve $a^2$, which is capable of closing the passage and serves to regulate the size of it in use. This case consists of two parts $b$ and $b'$, made semiglobular at their meeting parts, the part $b'$ having the vertical cylindrical extension. Secured between the two parts $b$ and $b'$ and across the chamber $c$ is an elastic diaphragm C. Secured to the center of this diaphragm C is a spiral spring D, which extends upward into the cylindrical portion $b^2$ of the case B. This spring D is secured to the diaphragm C by the plate $d$, which has lugs $d'$, (see Fig. 6,) which hold the lower end of the spring. On the under side of the diaphragm C is another plate $d^2$. The socket-piece E is secured to the diaphragm and to these plates by a nut $e$ on the under side of the plate $d^2$ and rises from the plate $d$. In the top of the socket-piece E is made a socket $e'$. In this socket rests the ball $f$ of a rod F, which rises centrally through the spring D and, passing out through the top $b^3$ of the case B, carries at its end a ball $f'$, in which is a slot $f^2$. At its upper end $d^3$ the spring D is screwed into a hollow plug or cylinder G, to the top of which is secured a check-nut $b^7$ by screw $b^6$, this check-nut serving to keep the coils of the spring from turning, and thus change the resiliency. Passing down through the cap $b^3$ and swiveling therein is a screw H, which engages the hollow plug G and by turning which such plug may be moved up and down and the diaphragm C regulated. The screw $h$ is placed in the cap $b^3$, so that the head of the screw $h$ will rest over a circumferential ledge of the screw H, below its head, and thus prevent it from rising, while the lower side of the ledge, resting on the cap $b^3$, prevents the screw H from descending. Secured in the slot $f^2$ at the top of the rod F is the pencil-lever K. This pencil-lever K is pivoted at the end remote from the pencil end and the rod F to a post L, secured to the cap $b^3$. This post L passes down through the hollow screw-plug $l$ and has on its lower end a washer $l'$, which prevents its removal from the screw-plug, but permits it to turn freely within such plug. Upon this screw-plug there is a check-nut $l^2$, which allows the screw-plug $l$ to be raised and lowered and then be made fast, which determines the location of the pen or pencil $k$ at the end of the pen or pencil lever.

M represents a lateral support. (Shown broken off in Fig. 1, but in plan view in Fig. 3.) One end of this support, which is of thin sheet brass or steel, rests in a slotted post $m$, the other end having a small clasp on it, which surrounds the pen-lever, as at $m'$. This support M holds the pen-lever to the vertical plane of the chart N.

The operation of the recorder is very simple. As already appears from the description given, the various parts are adjustable in the manner described. In using the device the substance the pressure of which is to be recorded passes into the apparatus on the under side of the diaphragm C, and the pressure thereon is recorded by the pencil $k$ in the usual way on the chart N, which revolves by means of a clock in the ordinary manner.

Having thus described my invention, what I claim is—

1. The combination of the case; the diaphragm within it; the spring secured to one end of the diaphragm; the hollow plug in which the upper end of the spring is secured; and means for raising and lowering said plug without opening the case or separating the parts, as set forth.

2. The combination of the case, B; the diaphragm, C, within it; the spring, D; the plug, G; the spring being secured to the diaphragm and plug; and the regulating-screw, H, as set forth.

3. The combination of the pencil-lever with the post, L; the hollow screw-plug, $l$; the check-nut, $l^2$; and the head of the case, B, as set forth.

In testimony whereof I affix my signature in presence of two witnesses.

FRANK LESLIE WOLFE.

Witnesses:
JOSHUA H. MILLETT,
ARTHUR L. BOWKER.